United States Patent [19]

Hayashi et al.

[11] Patent Number: 5,742,070
[45] Date of Patent: Apr. 21, 1998

[54] METHOD FOR PREPARING AN ACTIVE SUBSTANCE OF CHEMICAL CELLS

[75] Inventors: Yasushi Hayashi, Oobu-chi; Norikazu Adachi, Nogoyo; Hisanao Kojima, Kariya, all of Japan

[73] Assignee: Nippondenso Co., Ltd., Kariya, Japan

[21] Appl. No.: 657,183

[22] Filed: Jun. 3, 1996

Related U.S. Application Data

[63] Continuation-in-part of Ser. No. 308,531, Sep. 21, 1994, Pat. No. 5,565,688.

[30] Foreign Application Priority Data

| Sep. 22, 1993 | [JP] | Japan | 5-236252 |
| Dec. 28, 1993 | [JP] | Japan | 5-336002 |
| Jun. 2, 1995 | [JP] | Japan | 7-136942 |
| Mar. 13, 1996 | [JP] | Japan | 8-056541 |

[51] Int. Cl.$^6$ .................................................. H01M 4/88
[52] U.S. Cl. ............ 252/182.1; 423/594; 423/595; 423/596; 423/599; 423/604; 423/605; 423/632; 423/642; 252/518; 429/218; 429/220; 429/224
[58] Field of Search .................. 29/623.1; 252/182.1, 252/518; 429/218, 220, 224; 423/599, 604, 642, 594, 595, 596, 605, 632

[56] References Cited

U.S. PATENT DOCUMENTS

| 5,168,095 | 12/1992 | Munakata et al. | 505/1 |
| 5,378,560 | 1/1995 | Tomiyama | 429/217 |
| 5,565,688 | 10/1996 | Hayashi | 429/218 |

FOREIGN PATENT DOCUMENTS

| 2-009722 | 1/1990 | Japan. |
| 2-074505 | 3/1990 | Japan. |
| 2-139860 | 5/1990 | Japan. |
| 2-139861 | 5/1990 | Japan. |
| 7-142065 A | 6/1995 | Japan. |

OTHER PUBLICATIONS

Translation of JP 2-9722. (Jan., 1990).
Partial translation of JP 2-74505. (Mar., 1990).
Thackeray et al: "Lithium Insertion into Manganese Spinels", Material Research Bulletin, vol. 18, pp. 461-472, 1983 no month available.

*Primary Examiner*—Bruce F. Bell
*Attorney, Agent, or Firm*—Cushman Darby & Cushman IP Group of Pillsbury Madison & Sutro LLP

[57] ABSTRACT

A method for preparing an active substance for use in a positive electrode in chemical cells comprising a negative electrode is described. The method comprises preparing a mixed aqueous solution of a water-soluble lithium compound, a water-soluble transition metal compound, and an organic acid selected from the group consisting of organic acids having, in the molecule, at least one carboxyl group and at least one hydroxyl group and organic acids having at least two carboxyl groups, preparing an organic acid complex comprising lithium and a transition metal, and thermally decomposing the complex at temperatures sufficient for the decomposition to obtain the active substance. The complex may be prepared by dehydrating the solution. Alternatively, the complex may be formed by spraying the solution under heating conditions.

50 Claims, 8 Drawing Sheets

METHOD FOR PREPARING AN ACTIVE SUBSTANCE OF CHEMICAL CELLS

CROSS REFERENCE

This application is a continuation-in-part of application Ser. No. 08/308,531, filed Sep. 21, 1994, now U.S. Pat. No. 5,565,688.

BACKGROUND OF THE INVENTION

1. Field of the Invention

This invention relates to chemical cells and more particularly, to a method for preparing an active substance for use in a positive electrode in the cells of the type mentioned above.

2. Description of the Prior Art

Spinel form $LiMn_2O_4$ is known as a positive electrode active substance for non-aqueous electrolytic secondary cells which comprise lithium or lithium alloys as a negative electrode (Material Research Bulletin, 18, (1983) 461–472). For the preparation of $LiMn_2O_4$, there is known a solid phase process wherein various types of lithium salts and manganese salts are mechanically mixed and fired. For instance, Japanese Laid-open Patent Application No. 2-139860 proposes a solid phase process wherein $Li_2O$, $LiOH \cdot H_2O$ or the like and $\gamma$—$MnO_2$ are provided as starting materials, mixed together and heated.

Where the active substance is prepared according to the known solid phase process, the firing temperature is set at a level as low as 500° C. or below and is continued over 4 to 5 hours. The active substance obtained under these conditions is unlikely to suffer degradation but has a reduced capacity. On the contrary, when the firing temperature exceeds 700° C. or over, the resultant active substance has an increased capacity but undergoes a substantial degree of degradation, particularly of initial degradation. An active substance for a positive electrode which has a great capacity and a reduced degree of degradation has not been obtained up to now.

Principally, the reaction of the solid phase process depends on diffusion and thus, takes a very long time before the active substance acquires a uniform composition therethroughout. This is considered for the reason that with the firing within such a short time as set forth above, the compositional variation becomes great, resulting in the formation of an active substance which has a reduced capacity and a great degree of initial degradation.

On the other hand, lithium cells which utilize transition metal oxides as an active substance for the positive electrode are known as having a high energy density. Where such transition metal oxides are prepared by known solid phase processes wherein powders of active substances for the positive electrode are mixed and fired or baked, the capacity and charge and discharge cycle characteristic of the resultant cell are not good. To solve this problem, Japanese Laid-open Patent Application No. 2-74505 proposes a liquid phase process. In the process, lithium compounds, transition metal compounds and citric acid are dissolved in appropriate solvents, from which the solvent is evaporated. The citric acid is subsequently burnt off, followed by thermal decomposition reaction between the lithium compound and the transition metal compound to prepare an active substance.

Where the active substance is prepared in large amounts according to the liquid phase process, lithium and the transition metal are likely to segregate owing to the difference in their solubilities at the stages of the dissolution and the evaporation of the solvent, making it difficult to prepare an active substance which has a uniform composition. In the burning of the citric acid, oxygen is consumed so that the preparation of the active substance in large amounts invites the shortage of oxygen in the reaction system. This results in the active substance wherein the transition metal is not proper in valance.

SUMMARY OF THE INVENTION

It is accordingly an object of the invention to provide a method for preparing an active substance which is adapted for use as a positive electrode in chemical cells and which overcomes the problems involved in the prior art processes.

It is another object of the invention to provide a method for preparing an active substance for use in a positive electrode which is obtained by firing within a short time and which has very high crystallinity, ensuring a great capacity and a reduced degree of degradation.

It is further object of the invention to provide a method for an active substance for use in a positive electrode of non-aqueous electrolytic secondary cells, which is obtained in the form of particles whose size distribution is small.

The above objects of the invention can be achieved, according to one embodiment of the invention, by a method for preparing an active substance for use in a positive electrode in a chemical cell comprising a negative electrode and a positive electrode, which method comprising the steps of:

preparing a mixed aqueous solution of a water-soluble lithium compound, a water-soluble transition metal compound, and an organic acid selected from the group consisting of organic acids having at least one carboxyl group and at least one hydroxyl group, organic acids having at least two carboxyl groups in the molecule and mixtures thereof;

preparing an organic acid complex comprising lithium and a transition metal; and thermally decomposing the complex at temperatures sufficient for the decomposition to obtain the active substance.

Preferably, the mixed aqueous solution is sprayed and the resultant droplets are heated so that the complex is formed and is thermally decomposed substantially simultaneously with the formation of the complex.

According to another embodiment of the invention, there is also provided a method for preparing an active substance for use in a positive electrode in a chemical cell comprising a negative electrode and a positive electrode, which method comprising the steps of:

preparing a mixed aqueous solution of a water-soluble lithium compound, a water-soluble transition metal compound, and an organic acid selected from the group consisting of organic acids having one carboxyl group and one hydroxyl group, organic acids having at least two carboxyl groups in the molecule and mixtures thereof;

preparing an organic acid complex comprising lithium and the transition metal in the solution; and spraying the solution comprising the complex and heating the resultant droplets at a temperature sufficient for thermal decomposition of the complex to obtain the active substance.

According to a more specific and preferred embodiment of the invention, there is provided a method for preparing an active substance for use in a positive electrode in a non-aqueous electrolytic secondary cell comprising a negative electrode and a positive electrode, the method of making the active substance comprising the steps of:

providing an amorphorous citrate complex comprising lithium and a transition metal; and firing the complex at a temperature sufficient to obtain the active substance.

According to another more specific and preferred embodiment of the invention, there is provided a method for preparing an active substance for use in a positive electrode in a non-aqueous electrolytic secondary cell containing a negative electrode and a positive electrode, the method of making the active substance comprising the steps of:

preparing a mixed aqueous solution comprising a water-soluble salt selected from the group consisting of lithium hydroxide and lithium carbonate, a transition metal acetate and citric acid;

dehydrating the mixed aqueous solution to obtain a citrate complex; and firing the citrate complex at a temperature ranging from 300° C. to 900° C. to obtain a composite oxide of the lithium and the transition metal.

DETAILED DESCRIPTION AND EMBODIMENTS OF THE INVENTION

Figure 1:
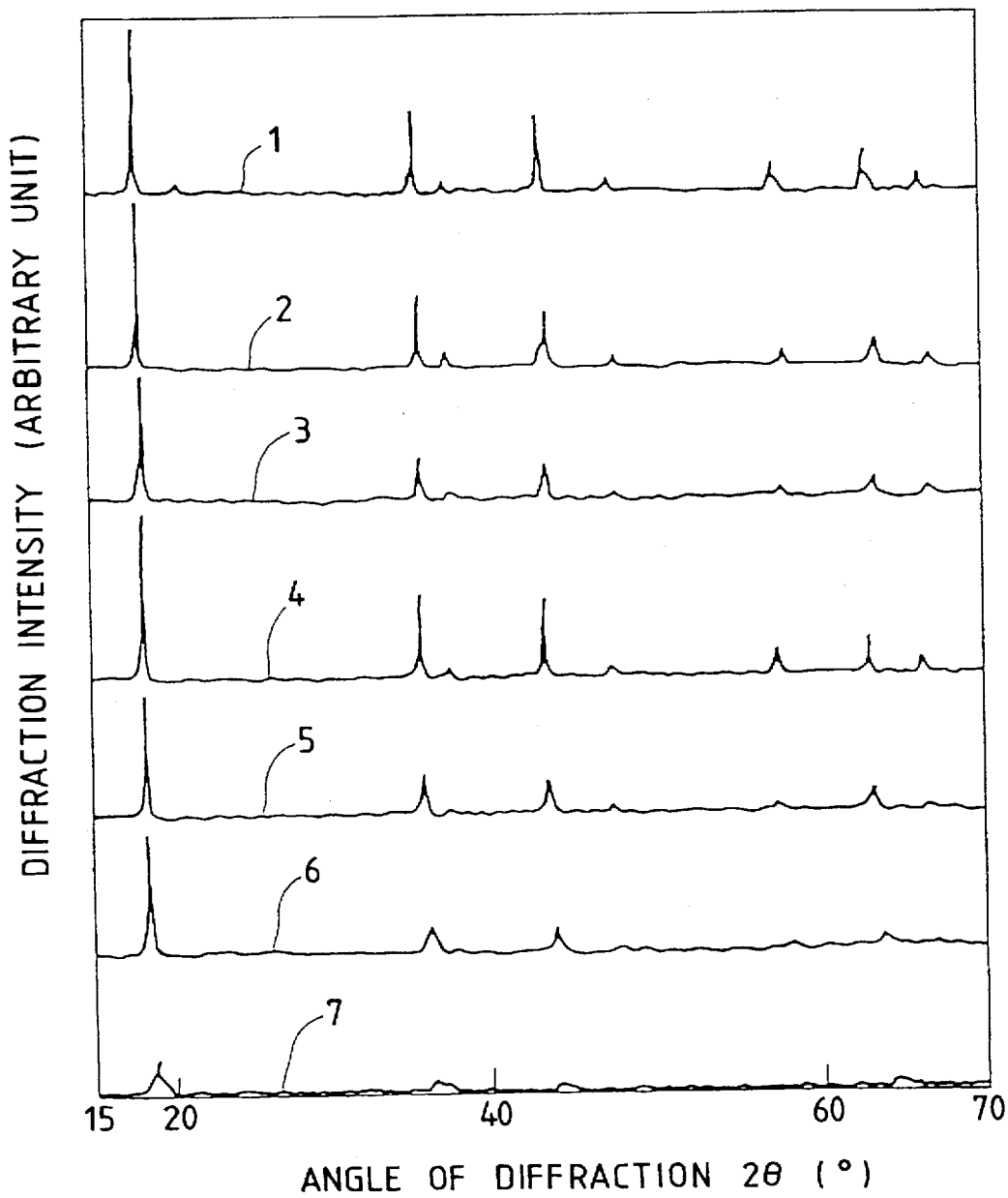
FIG. 1 is a chart showing a diffraction intensity of different types of active substances obtained in Examples 1 to 5 and Comparative Examples 1 and 2.

In accordance with one embodiment of the invention, there is provided a method for preparing an active substance for use in a positive electrode used in chemical cells. The method comprises the steps of preparing a mixed aqueous solution of a water-soluble lithium compound, a water-soluble transition metal compound, and an acid selected from the group consisting of organic acids having at least one carboxyl group and at least one hydroxyl group, organic acids having at least two carboxyl groups in the molecule, preparing an organic acid complex comprising lithium and a transition metal, and thermally decomposing the complex at temperatures sufficient for the decomposition to obtain the active substance.

It will be noted here that the chemical cells used herein include non-aqueous electrolytic secondary cells and the like.

The water-soluble lithium compound used in the first step may be any lithium salts or compounds which are soluble in water. Preferably, the compounds include lithium hydroxide, lithium acetate, lithium carbonate, lithium nitrate and mixtures thereof. These compounds may be hydrous or anhydrous. For instance, LiOH and LiOH.H$_2$O may be likewise used.

The transition metal compounds include hydroxides, carbonates, acetates, sulfates, hydrochlorides, and nitrates of manganese, cobalt, nickel, vanadium, iron, copper, titanium and chromium and mixtures thereof. These compounds may be hydrous or anhydrous.

Preferred examples of the transition metal compounds include acetates such as $Mn(CH_3COO)_2.4H_2O$, $Co(CH_3COO)_2.4H_2O$, $Cu(CH_3COO)_2.H_2O$, and the like. These salts including the acetates may be used singly or in combination.

The organic acids useful in the present invention should be selected from those acids which have at least one hydroxyl group (—OH) and at least one carboxyl group (—COOH) and those acids which have at least two carboxyl groups in the molecule. Specific and preferred examples of such acids include citric acid, tartaric acid, glycolic acid, lactic acid, oxalic acid, maleic acid, phthalic acid, and the like, which may be used is singly or in combination. Especially, citric acid is preferably used, which may be in the form of a hydrate such as $H_3C_6H_5O_7.H_2O$, in accordance with the embodiment of the invention wherein an amorphous complex salt is obtained after dehydration and then fired as will be described hereinafter.

For the preparation of the mixed aqueous solution of a lithium compound, a transition metal compound and an organic acid as defined above, these three components are merely dissolved in water and mixed together.

Although the manner of the preparation is not critical, it is preferred to first mix and aqueous solution of a lithium compound and an aqueous solution of citric acid, to which an aqueous solution of a transition metal compound is added quickly to obtain a uniform aqueous solution. Alternatively, an aqueous solution of a lithium compound and an aqueous solution of a transition metal compound may be first mixed so that there is at least partially formed a hydroxide or salt of the transition metal. Subsequently, the mixed solution containing the hydroxide or salt of the transition metal is further mixed with an aqueous solution of an organic acid of the type as defined above to re-dissolve the once formed transition metal hydroxide or salt to obtain an organic acid complex. Due to the mixing, the mixed solution is agitate well.

The mixing ratio of the metals should correspond to a compositional ratio of the metals in an intended composite oxide serving as an active substance. i.e. the lithium and the transition metal are mixed at a ratio corresponding to an atomic ratio of these metals in an intended composite oxide serving as an active substance.

The organic acid should be present in an amount by equivalent equal to the total equivalents of the metal ions in the water-soluble lithium compound and the transition metal compound. For instance, in order to obtain $LiMn_2O_4$ using $LiOH$, $Mn(CH_3COO)_2$ and citric acid, mixing ratios by mole of $LiOH.H_2O$, $Mn(CH_3COO)_2.H_2O$ and $H_3C_6H_5O_7.H_2O$ are 3:6:5.

In the preparation of the mixed aqueous solution, the mixing should preferably be effected at a temperature not higher than 40° C. under agitation.

For the formation of organic acid complexes comprising lithium and a transition metal, several procedures may be used in the practice of the invention.

One of such procedures comprises the step of immediately dehydrating the thus obtained mixed aqueous solution. In the dehydration step, the mixed aqueous solution is heated at a temperature of from 100° C. to lower than 150° C. under reduced pressure to obtain a gel. The thus obtained gel is dried to obtain an amorphous organic acid complex, e.g. an amorphous citrate complex. In this step, the mixed aqueous solution is dehydrated quickly at the temperature defined above. This is because when the dehydration is effected at temperatures lower than 100° C., a crystalline phase is undesirably apt to segregate. Over 150° C., part of the complex starts to decompose. In this sense, it is preferred to dehydrate at lower temperatures within the defined range under reduced pressure although higher temperatures may be used in an atmosphere containing oxygen molecules. It is also preferred that the dehydration is effected at a reduced pressure of not higher than 5000 Pa. The agitation of the aqueous solution during the course of the heating is liable to cause segregation and is not favorable.

In this step, an amorphous organic acid complex is obtained.

The acid, e.g. acetic acid, and water are released during the course of the dehydration step and are removed or dissipated by evaporation. As set out above, the dehydration step is preferably carried out under a reduced pressure at a temperature not higher than 150° C. It will be noted that the mixed solution obtained after the mixing step should preferably be subjected to deydration as soon as possible. If the mixture is allowed to stand for 2 to 3 hours, an intended composite oxide may not be obtained at a high yield.

When using an amorphous citrate or acid complex obtained in this manner, the X-ray diffraction analysis reveals that any specific peak does not appear.

In this procedure, the organic acid complex is then subjected to a firing step wherein it is fired at a temperature sufficient for the thermal decomposition of the complex to provide an active substance. The thermal decomposition temperature should preferably be in the range of 300° to 900° C., more preferably 700° to 900° C. The decomposed product of the organic acid such as citric acid is burnt to generate gases. Accordingly, it is preferred that a reactor furnace is forcibly exhausted to invariably introduce fresh air thereinto.

The firing temperature should preferably be higher within a range where the resultant active substance is not decomposed. For instance, with $LiMn_2O_4$, the composite oxide commences to be produced at approximately 250° C. In the vicinity of 250° C., however, the thermal decomposition does not proceed satisfactorily, and crystal growth becomes unsatisfactory. The resultant composite oxide has a good resistance to degradation but may not have a great capacity. When the firing temperature is preferably in the range of 300° to 900° C., more preferably 700° to 900° C., the crystals grow well as having a good resistance to degradation and a great capacity.

In the firing step, lithium and a transition metal are reacted with each other to provide a composite oxide such as, for example, $LiMn_2O_4$. As stated hereinbefore, the composite oxide starts to be formed at a temperature of approximately 250° C. Such a composite oxide is not satisfactory with respect to its crystallinity, with a reduced electric capacity. The composite oxide obtained by firing at a temperature of 300° to 900° C. has a good electric capacity and a good resistance to degradation with the high electric capacity being maintained over a long time.

In the above procedure, the mixed aqueous solution has been stated as being dehydrated and then thermally decomposed to obtain an active substance.

In an alternative and preferred procedure, the mixed aqueous solution is sprayed, and the resultant droplets are heated to a temperature at which an organic acid complex is formed and immediately thermally decomposed to obtain an active substance. More particularly, this procedure ensures the formation of the organic acid complex and its thermal decomposition to proceed substantially at the same time. In the procedure, the solution is converted to fine droplets by spraying and instantaneously thermally decomposed into an active substance. Accordingly, the lithium compound and transition metal compound used are prevented from segregation. The presence of the organic acid contributes to invariable stabilization of the composition between the lithium and transition metal compounds, thereby ensuring the formation of an active substance which is uniform in composition.

The temperature at which the droplets are heated and thermally decomposed should preferably in the range of from 250° to 1100° C., more preferably from 400° to 900° C. This is because fine droplets are more efficient in thermal efficiency than in the case of the thermal decomposition of the dehydrated gel in the first procedure. More particularly, the amorphous complex obtained after dehydration is solid in nature and is so small in surface area that the reaction area is not so great and the reaction does not readily proceed in the inside thereof. Accordingly, the firing temperature should be higher than 300° C. In addition, the firing temperature is as long as on the order of hours. Under these conditions, if the firing temperature exceeds 900° C., the once formed composite oxide may be further decomposed into undesirable products.

With the thermal decomposition of the droplets, the thermal decomposition and firing time is very short, e.g. about several seconds, and is unlikely to decompose when heated to a temperature of 1100° C. Moreover, the fine droplets are much greater in reaction area than in the case of the solid amorphous complex and are much better in thermal efficiency. Accordingly, the lower limit for the thermal decomposition temperature is as low as 250° C., at which an active substance can be efficiently formed.

On spraying, it is preferred to form the droplets while utilizing a gas containing oxygen molecules. By this, the complex can be thermally decomposed without shortage of oxygen in the decomposition system, thereby preparing an active substance having good characteristic properties.

Using the spraying procedure, the mixed aqueous solution should be preferably prepared as having concentrations of a lithium compound, a transition metal compound and an organic acid of 0.8 to 1.0 moles/liter, 1.4 to 1.6 moles/liter and 0.4 to 6.5 moles/liter, respectively.

Preferably, when the solution is prepared, bases, such as aqueous ammonia, are added in amounts sufficient to keep the pH of the solution in the range of 4 to 7, at which the solution is more stabilized.

In the firing step, the solution is sprayed by use of a spray nozzle using compressed air to form droplets. The droplets are then charged into a firing or thermal decomposition furnace while being entrained with the air used for the spraying or a separate carrier gas therefor. In the furnace, the thermal decomposition reaction is performed. The droplets are heated in the furnace at a temperature ranging from 250° to 1100° C., preferably from 400° C. to 900° C. Subsequently, the resultant active substance should preferably be fired at a temperature of from 400° to 1100° C. to obtain an active substance having better crystallinity. The firing time is not critical provided that better crystallinity is obtained. The size of the droplets is preferably 100 μm or below in order to obtain a fine powdery product.

Although such lithium compounds and transition metal compounds as having set out hereinbefore may likewise be used, it is preferred to use a manganese compound as the transition metal compound. In the case, the solution should preferably comprise a manganese compound and a lithium compound at a ratio by molar ion concentration between lithium and manganese of $0.5 \leq Li/Mn \leq 0.62$. More particularly, when the ratio by molar ion concentration is $Li/Mn=0.5$, $LiMn_2O_4$ is stoichiometrically formed. The ratio in the above-defined range enables one to obtain a lithium-rich LiMn composite oxide of the formula, $Li_{1+x}Mn_{2-x}O_4$ wherein x>0. Such a composite oxide has better capacity and cycle characteristics. More preferably, the ratio by molar ion concentration between Li and Mn in the solution should be in the range of $0.54 \leq Li/Mn \leq 0.62$.

In order to further improve capacity and cycle characteristics of an active substance, compounds of transition metals other than Mn should be preferably added along with a Mn compound. In the case, other transition metal compound or compounds are added in such a way that a ratio by molar ion concentration between Li and Mn is $0.5 \leq Li/Mn \leq 0.62$ and a ratio by molar ion concentration between Li and Mn is $0.5 < (Li+Me)/Mn \leq 0.67$ wherein Me is a transition metal other than Mn. Moreover, the ratio by molar ion concentration betweeen Me and Mn should preferably be in the range of $Me/Mn \leq 0.06$. In this case, it is most preferred to use lithium hydroxide as the lithium compound, manganese acetate as the transition metal compound, and citric acid as the organic acid. Using these compounds and acid, spinel-form composite oxides comprising Li, Mn and a transition metal other than Mn.

As stated before, the organic acids having at least one carboxyl group (—COOH) and at least one hydroxyl group (—OH) and at least two carboxyl groups in the molecule include, for example, citric acid, tartaric acid, glycolic acid, lactic acid, oxalic acid, maleic acid, phthalic acid and the mixtures thereof. These organic acids permit more than one metal to coordinate therein. Accordingly, the composition of a lithium compound and a transition metal compound in the solution invariably becomes stabilized, thereby leading to an enhanced efficiency of the thermal decomposition reaction.

In the spraying procedure, a lithium compound, a transition metal compound and an organic acid may be separately dissolved in water to provide separate aqueous solutions. These solutions are separately fed through different lines to a spraying nozzle wherein they are mixed together to obtain a mixed aqueous solution and sprayed.

In the method of the invention, a lithium compound and a transition metal compound are uniformly dissolved in water owing to the presence of an organic acid of the type defined before to such an extent the lithium compound and the transition metal compound are dispersed at a molecular level. Moreover, the organic acid used in the present invention is able to coordinate more than one lithium and/or transition metal ion in the molecule to form a complex during the course of the thermal decomposition.

In the case where the mixed solution is sprayed and the resultant droplets are heated, the components in the individual droplets are thermally decomposed within a short time, e.g. five seconds or over, thereby forming a compound comprising lithium and a transition metal. The thus obtained compound exhibits good crystallinity with a reduced amount of impurities. The compound is obtained in the form of substantially round particles having a narrow size distribution. When using the compound as an active substance for positive electrodes of chemical cells, the cell exhibits good capacity, cycle and storage characteristics. In addition, the round particles of the compound can increase a packing rate in the cell, thus leading to a higher energy density of the cell.

As a matter of course, the thus obtained active substance may further be heated or fired at a temperature of 400° to 1100° C. to obtain a substance having better crystallinity and a higher density. Alternatively, the active substance may be divided into fine pieces and compacted in a desired form by a usual manner, followed by firing at 400° C. to 1100° C., with similar results as set out above.

As defined before, the molar ion concentration between lithium and manganese in the solution is preferably in the range of $0.5 < Li/Mn \leq 0.62$. When the solution is thermally decomposed and fired, the resultant lithium manganese oxide is very useful as an active substance for positive electrode of chemical cells. Presumably, this is because when the molar ion concentration between lithium and manganese is over 0.5, $LiMn_2O_4$ has a spinel structure wherein Mn is substituted with Li at 16d. The substitution permits the average valence of Mn to be increased and the stretching of the lattices accompanied by doping and de-doping of Li at the time of charge and discharge cycles to be suppressed.

Likewise, when the molar ion concentration between lithium and manganese is in the range of $0.5 < Li/Mn \leq 0.62$ and the molar ion concentration between Li and Me (wherein Me is a transition metal other than Mn) and Mn is in the range of $0.5 < (Li+Me)/Mn \leq 0.67$, the resultant active substance becomes better in characteristic properties. In the case, Mn at 16d of the spinel structure of a $LiMn_2O4$ type compound is substituted partly with Li and also partly with Me. Thus, it considered that the cell characteristics are further improved.

In the spraying procedure, a lithium compound, a transition metal compound and an organic acid may be, separately, dissolved in water. The individual solutions are passed through separate lines to a spray nozzle in such a way that these solutions are mixed together at a position just before spraying from the spray nozzle thereby forming a mixed solution in the nozzle.

In the above embodiment, the solution comprising a lithium compound, a transition metal compound and an organic acid is sprayed and heated, thereby permitting a complex of these compound to be formed and to be thermally decomposed substantially simultaneously with the formation of the complex.

The spraying may be performed after formation of the complex comprising Li and a transition metal in the solution according to another embodiment of the invention. In order to form the complex of Li and a transition metal in the solution, a mixed solution of a lithium compound, a transition metal and an organic acid is maintained under conditions of a temperature of 10° to 40° C. and a time of 0.5 to 5 minutes under agitation.

The solution comprising the complex is subsequently subjected to spraying and thermal decomposition or firing in a manner as having set out hereinbefore. The starting materials, the molar ion concentration between Li with or without Me and a transition metal, firing conditions and the like are the same as those set forth above.

In accordance with a more specific and preferred embodiment of the invention, there is also provided a method for preparing an active substance for use in a positive electrode in a non-aqueous electrolytic secondary cell comprising a negative electrode and a positive electrode which comprises the steps of preparing an amorphous citrate complex comprising lithium and a transition metal; and firing the citrate complex at a temperature sufficient to obtain a composite oxide of the lithium and the transition metal.

The amorphous citrate complex is preferably obtained by mixing a water-soluble lithium compound selected from the group consisting of lithium hydroxide and lithium carbonate, a water-soluble salt of a transition metal, and citric acid. The mixture is dehydrated in a manner as having set out hereinbefore. The complex is preferably fired at a temperature of from 300° to 900° C.

Preferably, the water-soluble salt of a transition metal consists of a transition metal acetate.

In all the embodiments set out hereinbefore, the transition metal used should preferably consist of manganese (Mn) and the active substance should consist of spinel form $LiMn_2O_4$ in view of the characteristic properties thereof. In this case, Li may be partly replaced by Cu, so that the resultant active substance consists of a Cu-substituted product based on the spinel type $LiMn_2O_4$. This Cu-substituted product may be represented by the formula, $Li_{1-x}Cu_xMn_2O_4$, wherein x is in the range of 0.02 to 0.2.

The active substance obtained according to the method of the invention has a great electric capacity and a good resistance to degradation. The reason for this is not clearly understood at the present stage of our investigation. We assume that lithium and a transition metal are uniformly dispersed in the acid complex at least at the commencement of the firing step and that a composite oxide active substance is directly formed at the time of thermal decomposition without formation of any intermediate product. Accordingly, any segregation does not take place during the thermal decomposition and any solid phase reaction does not proceed throughout the preparation steps thereby providing an active substance of high crystallinity. This will bring about a good electric capacity and a good resistance to degradation.

Lithium secondary cells using an active substance for the positive electrode also have a great electric capacity and a good resistance to degradation.

The present invention is described by way of examples.

EXAMPLE 1

Components $LiOH.H_2O$, $Mn(CH_3COO)_2.4H_2O$ and $H_3C_6H_5O_7.H_2O$ were provided as starting materials for positive electrode active substance. These $LiOH.H_2O$, $Mn(CH_3COO)_2.4H_2O$ and $H_3C_6H_5O_7.H_2O$ starting components were, respectively, weighed at molar ratios of 3:6:5 and each dissolved in de-ionized water to obtain an aqueous lithium hydroxide, an aqueous manganese acetate solution and an aqueous citric acid solution having concentrations of 0.50 moles/liter, 1.000 mole/liter and 0.834 moles/liter, respectively.

One liter of the aqueous lithium hydroxide solution and 1 liter of the aqueous citric acid solution were mixed while agitating well, followed by further mixing of 1 liter of the aqueous manganese acetate solution while agitating well to obtain a light red mixed aqueous solution.

Thereafter, the aqueous solution was heated at 120° C. under a reduced pressure of approximately 3000 Pa., and dehydrated for gelation, followed by continuing the heating to obtain a citrate complex.

The citrate complex was scraped off from a container and was roughly milled, followed by firing at 800° C. in air for 4 hours to obtain a puff-shaped active substance.

EXAMPLE 2

Components $LiOH.H_2O$, $Cu(CH_3COO)_2.H_2O$, $Mn(CH_3COO)_2.4H_2O$ and $H_3C_6H_5O_7.H_2O$ were provided as starting materials for positive electrode active substance.

These $LiOH.H_2O$, $Cu(CH_3COO)_2.H_2O$, $Mn(CH_3COO)_2.4H_2O$ and $H_3C_6H_5O_7.H_2O$ starting materials were, respectively, weighted at molar ratios of 2.85:0.15:6:5 and each dissolved in de-ionized water to obtain an aqueous lithium hydroxide, an aqueous copper acetate solution, an aqueous manganese acetate solution and an aqueous citric acid solution having concentrations of 0.475 moles/liter, 0.025 moles/liter, 1.000 moles/liter and 0.834 moles/liter, respectively.

One liter of the aqueous lithium hydroxide solution and 1 liter of the aqueous citric acid aqueous solution were mixed under sufficient agitation, followed by further mixing of 1 liter of the aqueous manganese acetate solution and 1 liter of the aqueous copper acetate solution under sufficient agitation to obtain a blue mixed aqueous solution.

Then, the general procedure of Example 1 was repeated to obtain an active substance.

EXAMPLE 3

The general procedure of Example 1 was repeated except that the citrate complex obtained in Example 1 was fired at 350° C., thereby obtaining an active substance.

EXAMPLE 4

$LiOH.H_2O$, $Mn(CH_3COO)_2.4H_2O$ and $H_3C_6H_5O_7.H_2O$ were provided as starting materials for positive electrode active substance. These $LiOH.H_2O$, $Mn(CH_3COO)_2.4H_2O$ and $H_3C_6H_5O_7.H_2O$ starting materials were, respectively, weighed at molar ratios of 3:6:5 and each dissolved in de-ionized water to obtain an aqueous lithium hydroxide, an aqueous manganese acetate solution and an aqueous citric acid solution having concentrations of 0.50 moles/liter, 1.000 moles/liter and 0.834 moles/liter, respectively.

One liter of the aqueous Mn acetate solution was added to 1 liter of the aqueous lithium hydroxide solution under sufficient agitation to obtain a mixed solution having a precipitate considered as manganese hydroxide. One liter of the citric acid solution were then added to the mixture so that the precipitate was completely re-dissolved.

Thereafter, the mixed solution was dehydrated to dryness under reduced pressure at 120° C. to obtain a citrate complex gel.

The complex gel was fired in air at 800° C. for 4 hours to obtain a puff-shaped active substance.

EXAMPLE 5

The general procedure of Example 4 repeated except that the citrate complex obtained in Example 4 was fired at 350° C., thereby obtaining an active substance.

COMPARATIVE EXAMPLE 1

LiOH.H$_2$O and EMD (electrolytic manganese dioxide) were weighed at a molar ratio of Li and Mn of 1:2 and sufficiently mixed in a mortar, followed by firing in air at 800° C. for 4 hours, thereby obtaining an active substance.

COMPARATIVE EXAMPLE 2

The general procedure of Comparative Example 1 was repeated except that the firing temperature was set at 500° C.

Evaluation of Crystalline Structure and Crystallinity:

The active substances obtained in the examples and comparative examples were each subjected to X-ray diffraction analyses to evaluate the crystalline structure and crystallinity. To this end, a Cu—K$\alpha$ was used as an X-ray source and the measuring conditions included a tube potential of 40 kV, a tube current of 20 mA, a scanning speed of 2°/minute, a diverging slit width of 0.5°, and an acceptance slit width of 0.15°.

The relation between the diffraction intensity and the diffraction angle, 2$\theta$, of the respective active substances obtained in Examples 1 to 5 and Comparative Examples 1, 2 are shown in FIG. 1. In the figure, reference numerals 1 to 5, respectively, correspond to the active substances obtained in Examples 1 and 5 and reference numerals 6, 7, respectively, correspond to the active substances of Comparative Examples 1, 2.

Fabrication of Lithium Secondary Cells:

The respective active substances of the examples and the comparative examples were used to four button-shaped test cells for each active substance. A positive electrode was made by mixing 90 wt % of each active substance, 6 wt % of Ketjen black serving as a conductive agent, and 4 wt % of a tetrapolyethylenefluoroethylene binder. 50 mg of the resultant mixture was weighed and pressed molded on a stainless steel mesh current collector with a diameter of 14 mm at a compression pressure of 3 tons/cm$^2$ to provide a positive electrode. A negative electrode was made of metallic lithium directly pressed against a casing. A liquid electrolyte used was a solution of 1 M of lithium perchlorate (LiClO$_4$) dissolved in a mixed solution of equal amounts of propylene carbonate (PC) and 1,2-dimethoxyethane (DME). A separator was made of a polypropylene non-woven fabric sheet.

The four test cells for each active substance were, respectively, charged for 5 hours under limited conditions of a maximum current density of 2 mA/cm$^2$ and a maximum voltage of 4.1 V, followed by constant potential discharge to 2 V at a maximum current density of 2 mA/cm$^2$ and repetition of the charge and discharge cycles.

Figure 2:
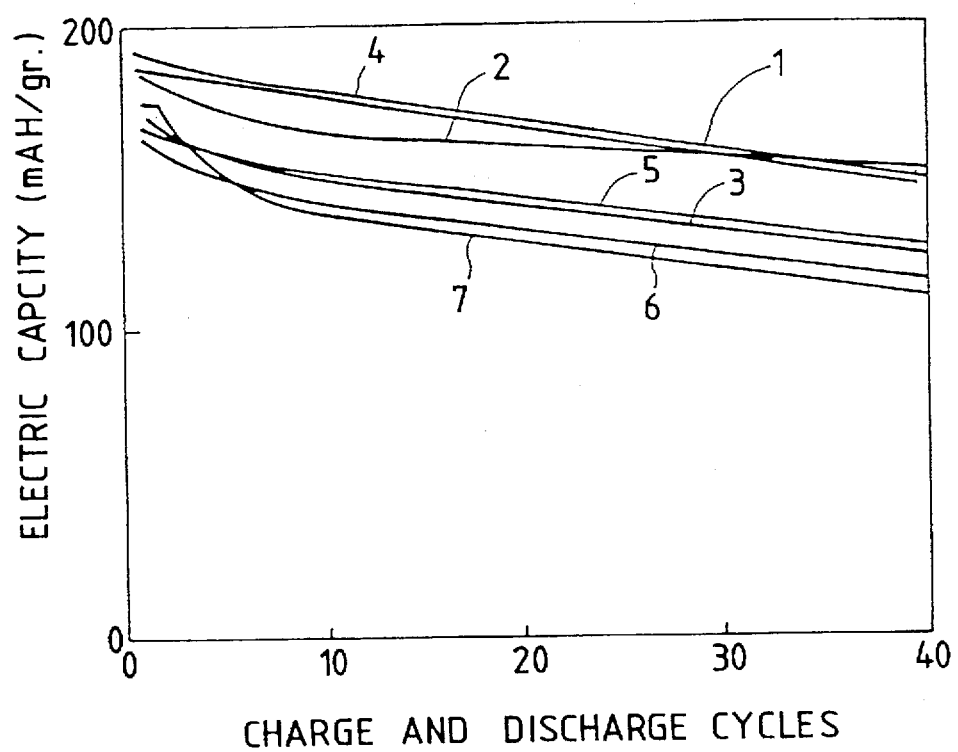
FIG. 2 is a graphical representation of the capacity in relation to the variation in charge and discharge cycles of lithium secondary cells using the active substance obtained in Examples 1 to 5 and Comparative Examples 1 and 2, respectively.

The relation between the capacity and the charge and discharge cycles for the respective cells is shown in FIG. 2 wherein reference numerals 1 to 5, respectively, indicate cells using the active substances obtained in Examples 1 to 5 and reference numerals 6, 7 indicate cells using the active substances obtained in Comparative Examples 1, 2, respectively.

As will be apparent from FIG. 2, the electric capacities of the lithium secondary cells using the active electrode active substances of Examples 1, 2 and 4 are initially greater than 180 mAh/g per positive electrode. After the 40th cycle, the capacity is kept at a level as great as approximately 150 mAH/gr. in all the cases. With the lithium secondary cells using the active substances of Examples 3 and 5, the initial degradation is small but the initial capacity is so small as approximately 165 mAH/gr.

The cell using the active substance of Comparative Example 1 has an initial capacity as great as about 180 mAH/gr., but its initial degradation is considerable, i.e. The capacity lowers to about 150 mAH/gr. at the 10th cycle and to about 110 mAH/gr. at the 40th cycle. The cell using the active substance of Comparative Example 2 suffers a relatively smaller degree of initial degradation but its initial capacity is as low as 160 mAH/gr.

In view of the above results, the cells using the active substances of Examples 1, 2 and 4 are pronouncedly high in capacity with a very reduced degree of degradation.

From FIGS. 1 and 2, it will be seen that the active substance which have a higher initial capacity are higher in the diffraction intensity. From this, it is considered that the improvement in the electric capacity ascribes to the substantial increasing amount of an active substance whose crystals grow well. The reason why the degradation is suppressed is difficult to explain. In view of the fact that with the active substances prepared according to known procedures, those which have a greater initial capacity are more liable to degrade whereas the active substance prepared according to the method of the invention, which has a great capacity, is unlikely to undergo degradation, it is assumed that the unlikelihood results from the very high crystallinity thereof.

EXAMPLE 6

Components LiOH.H$_2$O, Mn(CH$_3$COO)$_2$.4H$_2$O and H$_3$C$_6$H$_5$O$_7$.H$_2$O were provided as starting materials for positive electrode active substance. These LiOH.H$_2$O, Mn(CH$_3$COO)$_2$.4H$_2$O and H$_3$C$_6$H$_5$O$_7$.H$_2$O starting materials were, respectively, weighed at molar ratios of 3:6:5 and each dissolved in de-ionized water to obtain an aqueous lithium hydroxide, an aqueous manganese acetate solution and an aqueous citric acid solution having concentrations of 0.80 moles/liter, 1.60 mole/liter and 1.33 moles/liter, respectively.

One liter of the aqueous lithium hydroxide solution and the aqueous citric acid solution were mixed together. Subsequently, the aqueous manganese acetate solution was added to the mixture to obtain a mixed solution. It was confirmed that a citrate complex was formed in the solution.

In order to stabilize the solution, aqueous ammonia may be added to the mixture for adjustment in pH. More particularly, if any aqueous ammonia was not added to the mixed solution, the pH of the solution was found to be 4. It was confirmed that when the pH was increased by addition of ammonia, the solution became more stabilized.

Figure 3:
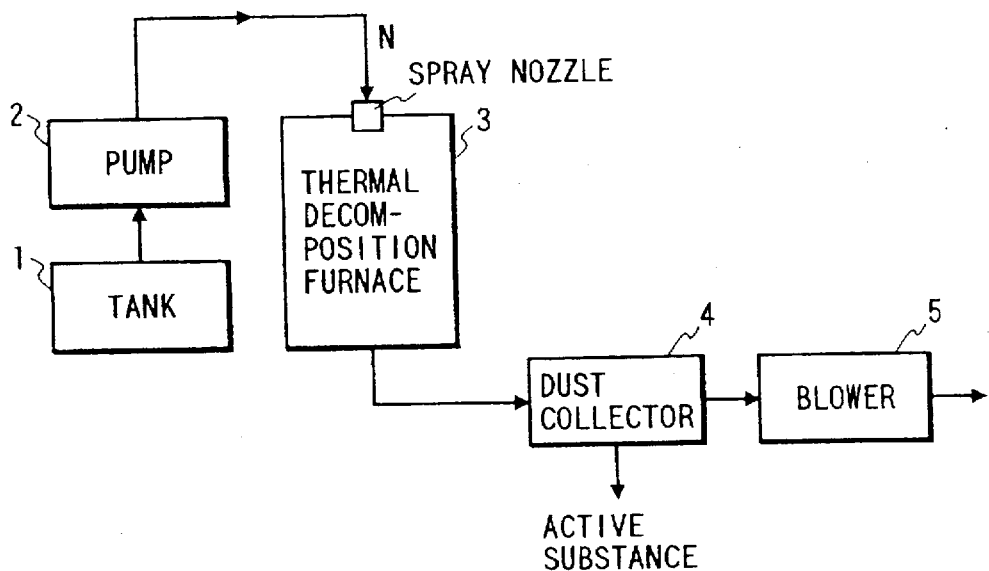
FIG. 3 is a flow chart showing a spraying and firing apparatus according to an embodiment of the invention.

Then, the mixed solution was fired using an apparatus shown in FIG. 3. The apparatus has a tank 1 for starting materials, and a pump 2 for feeding the starting material in the tank to a thermal decomposition furnace 3 through a spray nozzle N. A dust collector 4 is connected to the furnace 3 at one end thereof and to a blower 4 at the other end.

In operation, the mixed solution in the tank 1 is fed by means to the pump 2 to the nozzle N from which the solution is sprayed into the furnace 3. In the furnace 3, the sprayed droplets are instantaneously dried and thermally decomposed to provide an active substance in the form of a powder. The powder is separated from a gas in the dust collector 4. The separated gas is exhausted from the blower 5 to outside.

Figure 8:
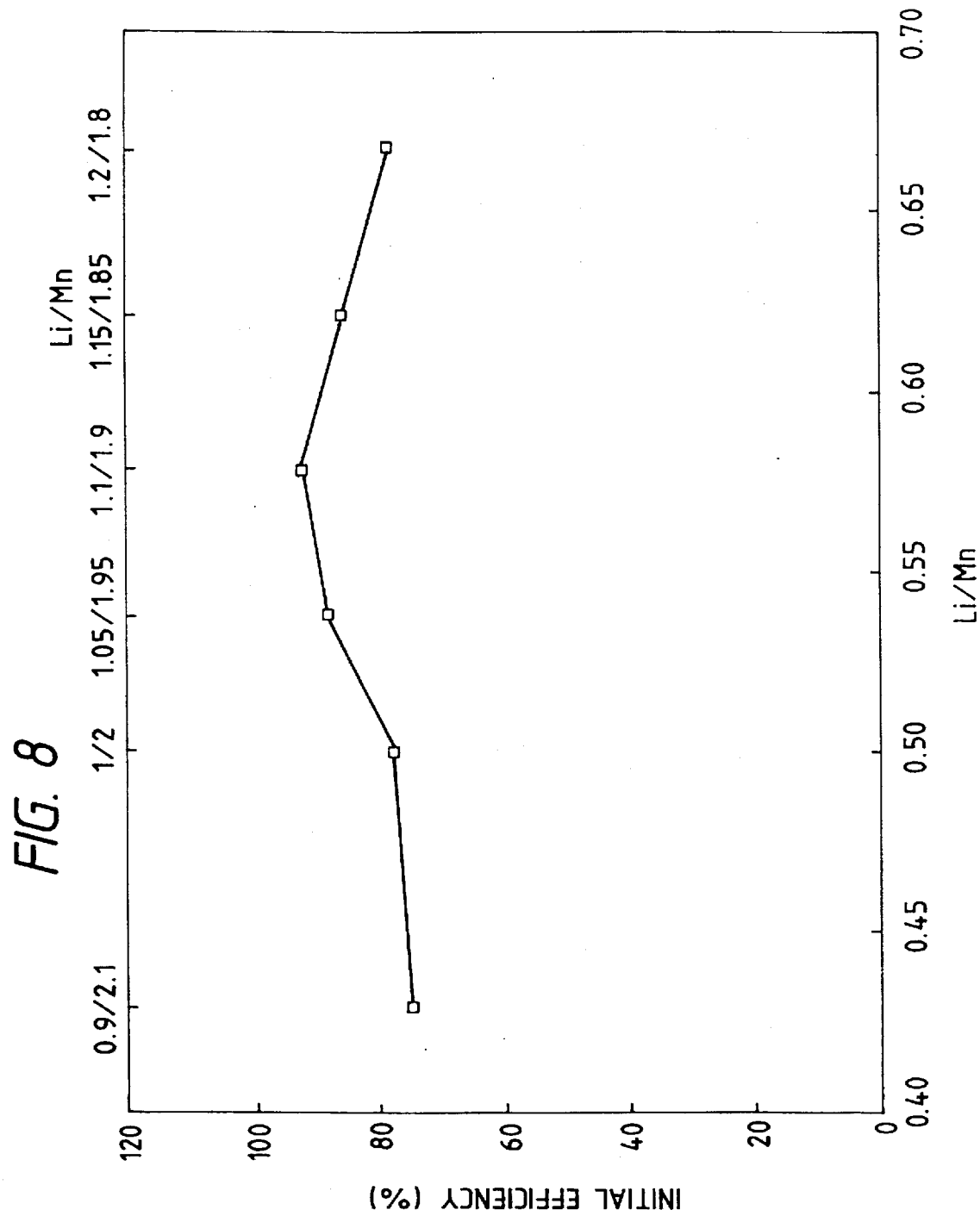
FIG. 8 is a graph showing the relation between the initial efficiency and the ratio of Li and Mn in lithium manganese oxide used as an active substance in Example 10.

The spraying is more particularly described. The solution from the pump 2 is fed under pressure to the nozzle N at which compressed air is applied to the solution thereby spraying droplets of the solution in the furnace 2. The size of the droplets can be appropriately controlled by controlling the amount of the solution being sprayed, the pressure of air and the total concentration in the solution. The thermal decomposition temperature is controlled by controlling the furnace temperature.

Where an organic acid is added to the other components, the organic acid strongly, readily combines with a transition metal and/or lithium, with the high possibility that these metals or compounds are very liable to settle. This may cause the mixed solution to be compositionally varied or may cause a pipe to be clogged with the precipitate. To avoid this, the organic acid is added immediately before spraying the mixed solution. More particularly, as shown in FIG. 8, an aqueous solution of 0.8 moles/liter of a lithium compound, an aqueous solution of 1.6 moles/liter of a transition metal compound and an aqueous solution of 1.33 moles/liter of an aqueous organic acid solution are, for example, prepared in tanks 1a, 1b and 1c, respectively. Then, these solutions are separately fed through pumps 2a, 2b and 2c at given flow rates to a mixing vessel 6 wherein they are mixed. The mixed solution is forcedly fed via a spray nozzle to a thermal decomposition furnace 3 as illustrated with respect to FIG. 3. The resultant active substance is collected in a dust collector 4 and the separated air is fed to outside by means of a blower 5.

If the starting aqueous solutions are mixed in a manner as set out above, continuous feed of the mixed solution over 24 hours is possible. In contrast, when a mixed solution wherein the aqueous organic acid solution has been preliminarily mixed with the other aqueous solutions is used, the solution has to be exchanged with a fresh one about every 2 hours in order to avoid the compositional variation and/or the clogging of pipes.

Figure 10:
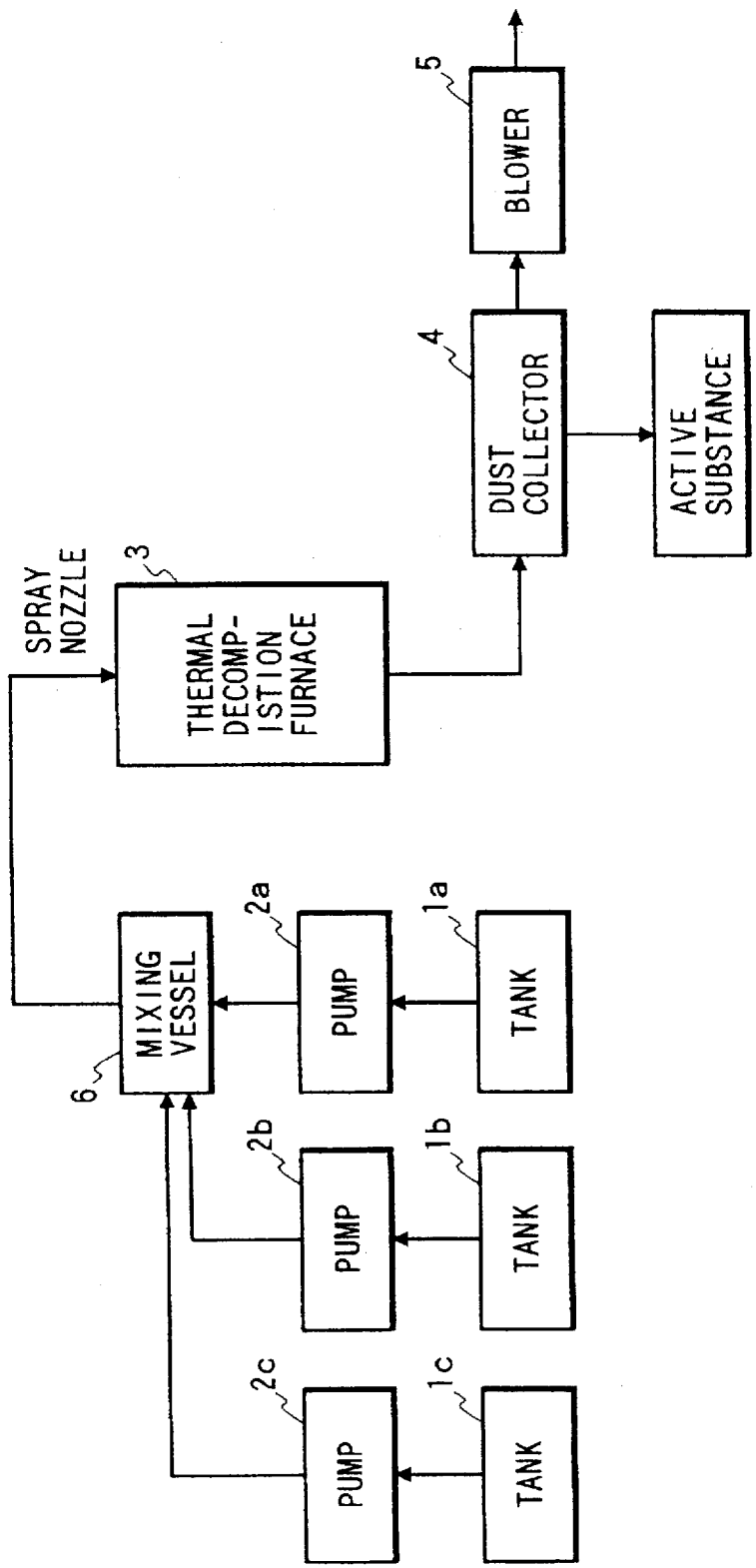
FIG. 10 is a flow chart showing a spraying and firing apparatus like FIG. 3 but comprising a mixing vessel.

It will be noted that in FIG. 10, the aqueous solutions of the lithium compound and the transition metal compounds are placed in the separate tanks, but may be mixed together in one tank.

In this example, the solution was sprayed under conditions including an amount of the mixed solution of 30 ml/minute and an air pressure of 0.4 MPa and introduced into the furnace 3 at a furnace temperature kept at 880° C. Instantaneously with the introduction of the solution, the water was evaporated, after which the citric acid was burnt out and the thermal decomposition reaction between the lithium and manganese compounds took place. The resultant product was stayed in the surface for a time of 5 seconds or over in order to enhance its crystallinity.

Thereafter, the active substance obtained in the furnace was collected in the dust collector 4. It was found that the $LiMn_2O_4$ was substantially free of any impurity and was obtained in the form of spherical particles having a uniform particle size of 3 to 30 µm. Since the sprayed droplets were heated and thermally decomposed, the resultant particles became porous with a specific surface area being as high as 20 $m^2/g$.

The thus obtained active substance was used to make a cell in the following manner. The active substance for a positive electrode was mixed with a Ketjen black conductive agent and a polytetrafluoroethylene (PTFE) binder at mixing ratios of 90:6:4. The mixture was press molded on a stainless steel mesh to provide a positive electrode. A negative electrode used consisted of metallic lithium. A polypropylene non-woven fabric piece was used as a separator. An electrolyte used consisted of a solution of 1 mole of $LiPF_6$ in a mixed solvent of equal amounts of propylene carbonate (PC) and 1,2-dimethoxyethane.

The charge and discharge characteristics of the cell were evaluated as follows: the cell was charged at a constant current of 2 $mA/cm^2$ to a potential of 4.1 V, and at a constant voltage of 4.1 V for a total time of 5 hours; and the cell was discharged to a level of 2.0 V at 2 $mA/cm^2$.

The initial discharge capacity of the positive electrode active substance obtained in this example was as high as 210 mAb/g.

Figure 4:
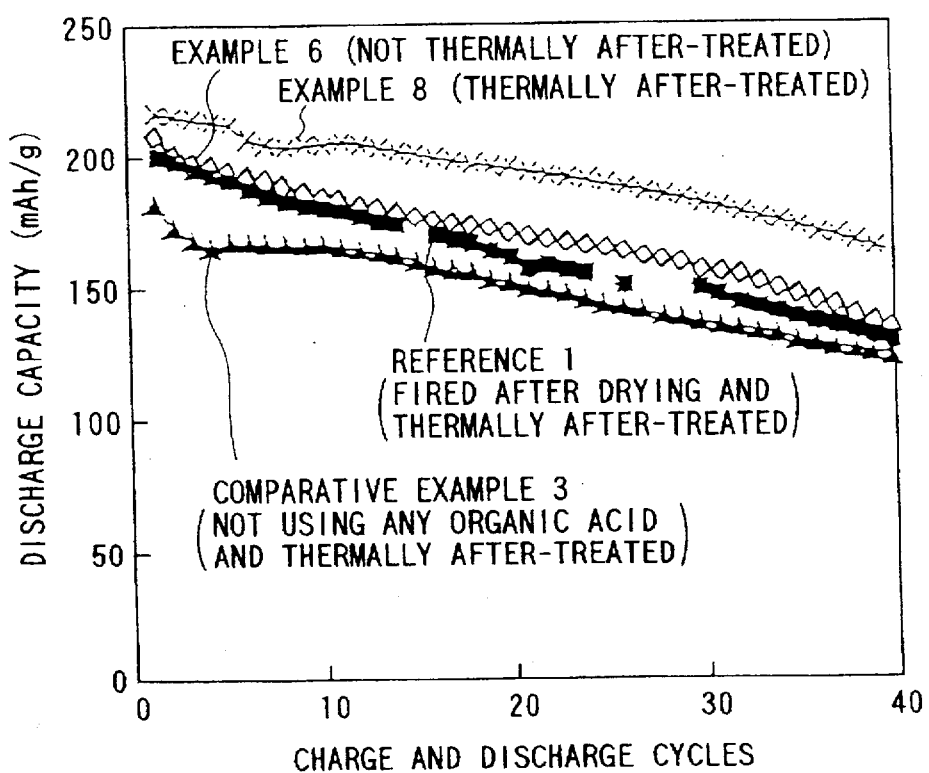
FIG. 4 is a graphical representation of the discharge capacity in relation to the variation in charge and discharge cycles of lithium secondary cells using the active substances obtained in Examples 6 and 8, Reference 1 and Comparative Example 3.

The electric capacity of the positive electrode active substance in relation to the charge and discharge cycles is shown in FIG. 4 as Example 6.

EXAMPLE 7

In order to check the influence of the thermal decomposition temperature, the general procedure of Example 6 was repeated except that the thermal decomposition temperature was set at 450° C., 580° C. and 730° C., respectively, thereby obtaining three types of positive electrode active substances.

Figure 5:
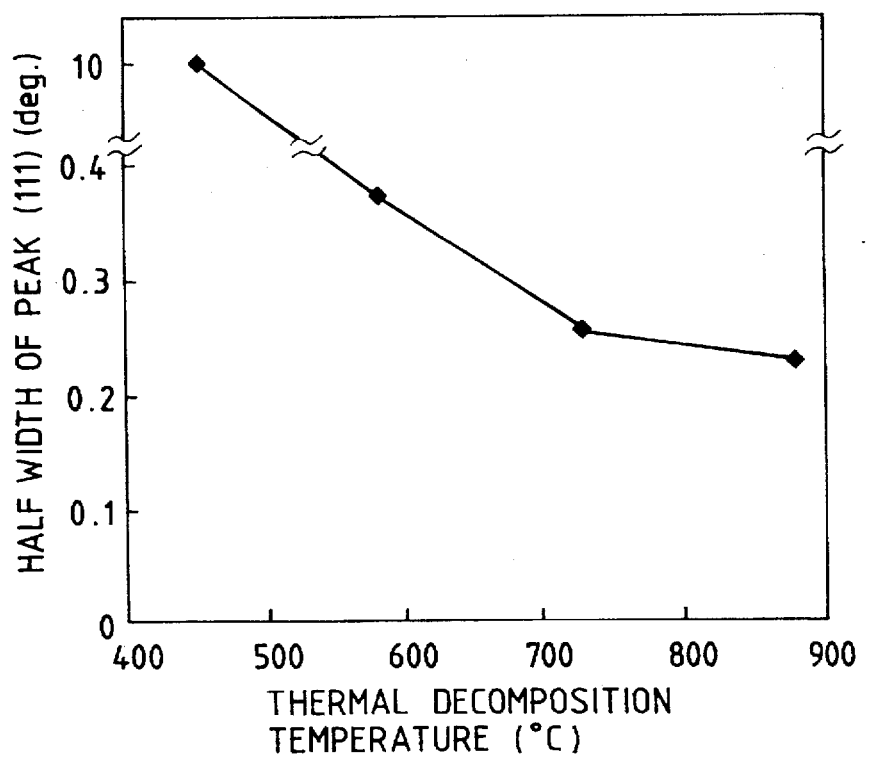
FIG. 5 is a graph showing the relation between the thermal decomposition temperature and the crystallinity of the active substance obtained in Example 7.

The relation between the peak half width at (111) of the active substance and the thermal decomposition temperature is shown in FIG. 5. FIG. 5 shows that when the thermal decomposition is carried out at a high temperature of 880° C., the peak half width at (111) of the crystals of the active substance is so small that the crystallinity is good. This indicates that the crystallinity increases by the high temperature treatment. A cell using the active substance obtained by the thermal decomposition at 880° C. exhibited good cell characteristics including an initial capacity and a cycle characteristic. However, it was found that when the thermal decomposition was performed at a temperature higher than 1100° C., Li is sublimated, resulting in degradation of the characteristics. Accordingly, the thermal decomposition temperature is preferably from 580° C. to 1100° C., more preferably from 730° C. to 950° C.

EXAMPLE 8

The active substance obtained in Example 6 was further thermally treated at 900° C. for 8 hours in order to increase the crystallinity. The resultant substance was subjected to the evaluation of cell characteristics in the same manner as in Example 6. The cell capacity in relation to the variation in charge and discharge cycles is shown in FIG. 4 as Example 8. As will be apparent from FIG. 4, the discharge capacity of the active substance and the discharge capacity in relation to the cycles are both higher than those of Example 6. This is considered due to the thermal treatment after the formation of the active substance.

EXAMPLE 9

The general procedure of Example 8 was repeated except that the active substances obtained in the same manner as in Example 7 using thermal decomposition temperatures of 450° C., 580° C., 730° C. and 880° C. were, respectively, further thermally after-treated to obtain positive electrode active substances. The relation between the active substances obtained after different thermal decomposition temperatures and the size distribution is shown in FIG. 6.

Figure 6:
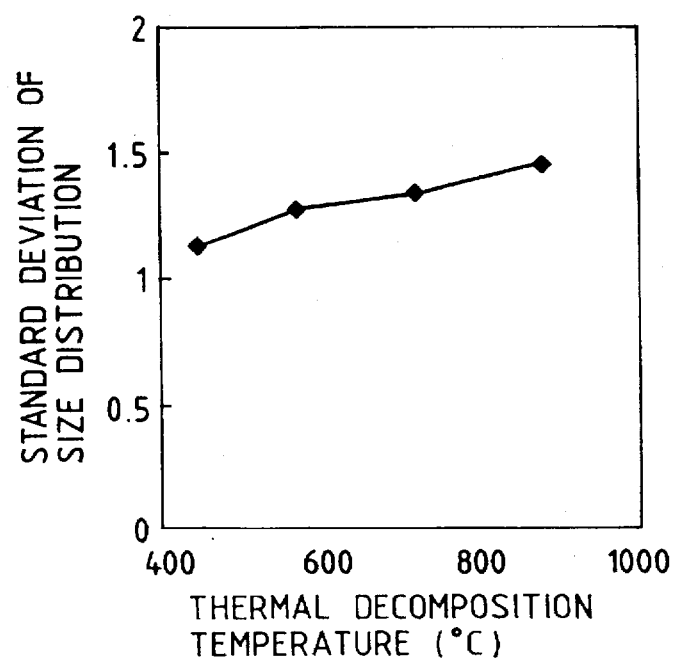
FIG. 6 is a graph showing the relation between the size distribution of the active substance obtained in Example 9 and the thermal decomposition temperature.

As will be apparent from FIG. 6, when the thermal decomposition temperature is in a range of as low as 450° C. to 730° C. and the resultant substance are, respectively thermally after-treated or fired at 900° C., the active substances have a narrow range of size distribution. This is considered for the reason that uniform growth of crystals is expected when the skeletal structure of the crystals is formed at low temperatures, from which the crystals are grown. In this sense, the thermal decomposition temperature is generally in the range of from 250° C. to 1100° C. The temperature of 250° C. is the lowest temperature at which the composite oxide such as $LiMn_2O_4$ can be formed. When importance is placed particularly on the size distribution, the thermal decomposition temperature is preferably in the range of from 450° C. to 750° C.

COMPARATIVE EXAMPLE 3 AND REFERENCE 1

The general procedure of Example 6 was repeated except that any organic acid was not used in the preparation of the mixed solution (Comparative Example 3) and that the mixed solution of Example 6 was evaporated to dryness at 80° C. to 150° C. and then fired at a temperature of 400° C. to 900° C. In both cases, the resultant active substances were further thermally treated in the same manner as in Example 8. The results are shown in FIG. 4. The discharge capacity of the active substance represented by Reference 1 wherein the mixed solution is evaporated to dryness without thermal decomposition by spraying, fired and thermally after-treated is slightly poorer than that of the active substance by the spraying. However, the discharge capacity of the active substance of Reference 1 is greater than that of Comparative Example 3 in FIG. 4 wherein no organic acid is used. It should be noted that the active substance of Reference 1 is one which is obtained according to the embodiment of the invention and is shown as Reference 1 for comparison with that obtained by the spraying procedure.

More particularly, when the solvent is gradually evaporated by heating the mixed solution at a temperature of 80° to 150° C. without use of the spraying and thermal decomposition procedure, the resultant active exhibits a discharge capacity of about 200 mAh/g which is smaller than those obtained by the spraying and thermal decomposition procedure. Nevertheless, this discharge capacity is of no problem in practical applications. The reason why the active substance obtained by the spraying and thermal decomposition procedure is further improved in the discharge capacity over the active substance of Reference 1 is as follows. It takes a relatively long time before evaporation of the solvent in the case of the reference, so that the compositional variation takes place during the course of the evaporation, thereby permitting some impurities to be incorporated in the final active substance product.

The active substance obtained by spraying and thermal decomposition of an organic acid-free mixed solution exhibited a discharge cell capacity of 180 mAh/g which is significantly inferior not only to that of Example 6, but also to that of Reference 1.

EXAMPLE 10

The general procedure of Example 6 was repeated except that $Li_2CO_3$ was used as the lithium compound, $MnCO_3$ used as the transition metal compound, and $H_2C_6H_5O_7.H_2O$ (citric acid) used as the organic acid and that the respective components were dissolved in distilled water as, respectively, having concentrations of 0.07 moles/liter of Li, 0.14 moles/liter of Mn and 0.35 moles/liter of citric acid as dissolved in distilled water. These components were dissolved in the order of citric acid, $MnCO_3$ and $Li_2CO_3$. The thus obtained solution was sprayed by entrainment with air at a pressure of 0.4 MPa in a furnace kept at 880° C., thereby obtaining lithium manganese composite oxide.

The composite oxide was thermally treated at 900° C. for 8 hours to obtain an active substance for positive electrode.

The active substance exhibits a discharge capacity of 215 mAh/g, which was substantially equal to that attained by using $LiOH.H_2O$ and $Mn(CH_3COO)_2.4H_2O$. Thus, inexpensive $MnCO_3$ could be likewise used.

EXAMPLE 11

This example is to evaluate cell characteristics of lithium manganese oxide depending on the composition of starting materials.

Li compound and Mn compound used in Example 6 were provided and mixed at mixing rations by molar ion concentration between Li and Mn in a mixed solution of Li/Mn= 0.43, 0.50, 0.54, 0.58, 0.62 and 0.67. The respective mixed solutions were each sprayed in a furnace at 730° C. and thermally decomposed in the same manner as in Example 6, followed by firing at 900° C. to obtain lithium manganese oxide. The respective lithium manganese oxides obtained in this manner are considered as having a compositional formula, $Li_{1+x}Mn_{2-x}O_4$ wherein x=–0.1, 0.05, 0.10, 0.15 and 0.2 corresponding to the above-indicated mixing ratios.

The charge and discharge characteristics of the respective lithium manganese oxide as the positive electrode active substance in a cell were determined under the following conditions. The call was made in the same manner as in Example 6 and was charged at a constant current of 2 mA/cm² to a voltage of 4.3 V and then at 4.3 V for a total time of 3 hours. The cell was discharged at 2 mA/cm² to a level of 2.0 V. A standing time of 10 minutes was permitted between the charge and discharge cycles.

Figure 7:
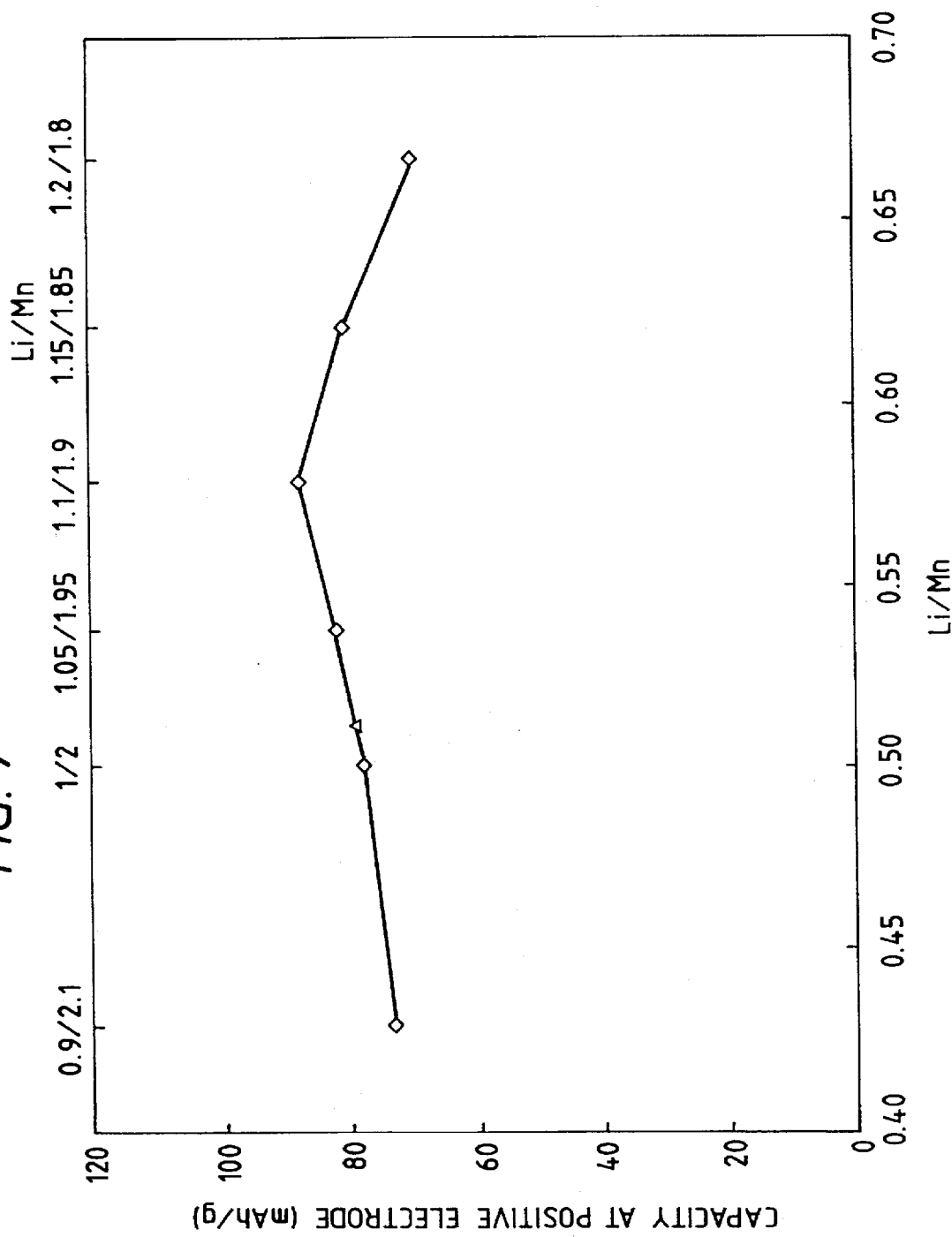
FIG. 7 is a graph showing the relation between the positive electrode capacity and the ratio of Li and Mn in lithium manganese oxide used as an active substance in Example 10.

The results of capacity and initial efficiency of the cells using the respective lithium manganese oxides are, respectively, shown in FIGS. 7 and 8. From the results, it will be seen that when using the lithium manganese oxides of the formula, $Li_{1+x}Mn_{2-x}O_4$ wherein x=–0.1, 0, 0.05, 0.10, 0.15 and 0.2 corresponding to the above-indicated mixing ratios, the initial capacity and cycle characteristic of the cells are improved over the $LiMn_2O_4$ wherein Li/Mn=0.5. Especially, the cell using the lithium manganese oxide of the above formula where Li/Mn=0.58 as a positive electrode exhibits both maximal capacity and initial efficiency. Thus, such an oxide is most preferred.

Figure 9:
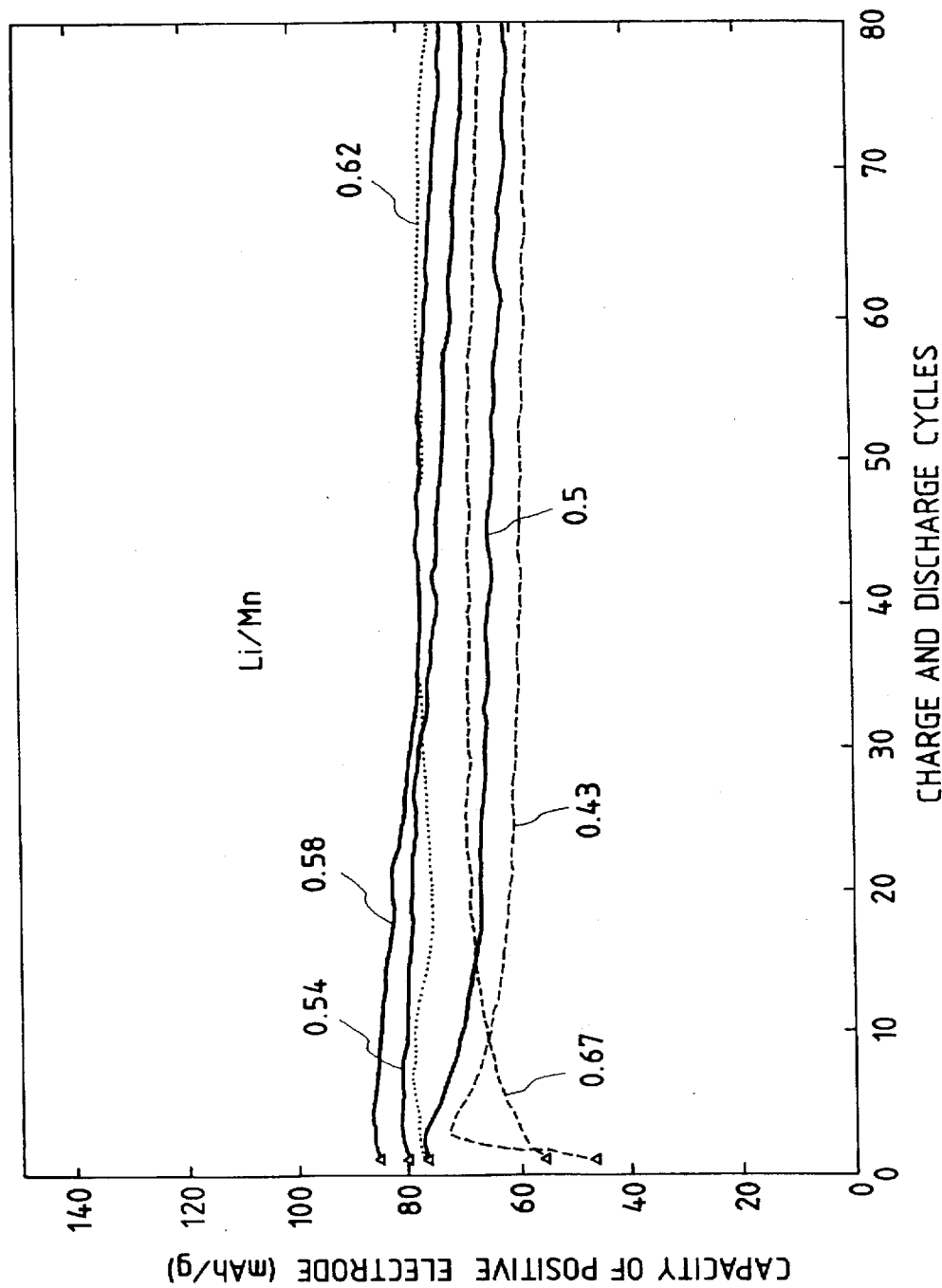
FIG. 9 is a graph showing the relation between the positive electrode capacity and the cycle characteristic for a different molar ratio of Li and M in lithium manganese oxide used as an active substance in Example 10.

FIG. 9 shows the relation between the positive electrode capacity and the cycle characteristic for different types of lithium manganese oxides used above. In the figure, the values of 0.43, 0.5, 0.54, 0.58, 0.62 and 0.67 are, respectively, molar ratios between Li and Mn of the lithium manganese oxide compounds used.

The results of FIG. 9 reveal that the cycle characteristic of the cells using the lithium manganese oxide compounds having Li to Mn ratios of 0.54, 0.58, 0.62 and 0.67 are better than that of $LiMn_2O_4$.

In view of the cell characteristics, it is preferred to use lithium manganese oxide compounds wherein the amount of Li is increased so that the ratio by molar ion concentration between Li and Mn in Li and Mn starting materials is greater than 0.5, e.g. 0.54, 0.58, 0.62 or 0.67.

EXAMPLE 12

This example illustrates the substitution of Mn not only with Li, but also with a transition metal other than Mn, i.e. Cu.

Copper acetate was provided as a Cu-containing starting material, and lithium hydroxide monohydrate and manganese acetate tetrahydrate were, respectively, used as Li- and Mn-containing starting materials as in Example 6. Mixed solutions were prepared using these starting materials in such a way that the ratios by molar ion concentration of Li, Cu and Mn were, respectively, Li/Cu/Mn=1/0.05/1.95, 1/0.1/1.9, 1.05/0/1.95, 1.05/0.05/1.9, 1.05/0.1/1.85, 1.1/0/1.9, 1.1/0.05/1.85 and 1.1/0.1/1.8. These solutions were, respectively, treated in the same manner as in Example 6 to obtain active substances. The thus obtained active substances were assumed to have a composition of $Li_{1+x}Cu_yMn_{2-x-y}O_4$ wherein x=0, 0.05, 0.1 and y=0.05, 0.1.

The initial capacity characteristic and the capacity characteristic after 50 charge and discharge cycles of the cells using the active substances obtained above are shown in Table 1 below.

TABLE 1

| Ratios of Li/Cu/Mn elements in lithium manganese oxide active substances | Initial capacity of lithium cell (mAh/g) | Capacity (%) after 50 charge and discharge cycles based on the initial capacity of lithium cell |
| --- | --- | --- |
| 1/0.05/1.95 | 78 | 89 |
| 1/0.1/1.9 | 79 | 92 |
| 1.05/0/1.95 | 82 | 89 |
| 1.05/0.05/1.9 | 82 | 95 |
| 1.05/0.1/1.85 | 70 | 81 |
| 1.1/0/1.9 | 87 | 94 |
| 1.1/0.05/1.85 | 87 | 95 |
| 1.1/0.1/1.8 | 72 | 94 |

The results reveal that the active substances having Li/Cu/Mn values of 1.05/0.05/1.9 and 1.1/0.05/1.85 are improved in the cycle characteristic over those which are free of any Cu. Moreover, it has also been found that when the Cu content is increases to the extent that Li/Cu/Mn=1/0.1/1.9 and 1.1/0.1/1.85, the initial capacity lowers. From this, it has been confirmed that when the ratio by molar ion concentration of Cu and Mn is 0.06 or below, the characteristics are improved.

EXAMPLE 13

The general procedure of Example 6 was repeated using tartaric acid, glycolic acid, lactic acid, oxalic acid, maleic acid and phthalic acid, thereby obtaining active substances. These substances were, respectively, used to make cells and evaluated with respect to the initial capacity and the capacity after 50 charge and discharge cycles, with similar results as in Example 6.

What is claimed is:

1. A method for preparing an active substance for use in a positive electrode in a chemical cell comprising a negative electrode and a positive electrode, said method comprising the steps of:

preparing a mixed aqueous solution of at least one water-soluble lithium compound, at least one water-soluble transition metal compound, and at least one organic acid selected from the group consisting of organic acids having at least one carboxyl group and at least one hydroxyl group, organic acids having at least two carboxyl groups, and mixtures thereof;

preparing an organic acid complex consisting of lithium, at least one transition metal, and oxygen; and thermally decomposing the complex at temperatures sufficient for the decomposition to obtain the active substance.

2. A method according to claim 1, wherein said organic acid consists of citric acid and said complex consists of an amorphous citrate complex obtained by dehydrating said solution.

3. A method according to claim 2, wherein said amorphous citrate complex is fired at a temperature of 300° to 900° C.

4. A method according to claim 1, wherein said organic acid is selected from the group consisting of tartaric acid, glycolic acid, lactic acid, oxalic acid, maleic acid, phthalic acid, and a mixture thereof.

5. A method according to claim 1, wherein said lithium compound is a member selected from the group consisting of lithium hydroxide, lithium acetate, lithium carbonate, lithium nitrate and mixtures thereof.

6. A method according to claim 1, wherein said transition metal compound is at least one member selected from the group consisting of hydroxides, carbonates, acetates, sulfates, hydrochlorides, and nitrates of manganese, cobalt, nickel, vanadium, iron, copper, titanium and chromium.

7. A method according to claim 1, wherein said solution is sprayed and the resultant droplets are heated to form said complex in individual droplets and thermally decomposed to obtain the active substance simultaneously with the formation of said complex.

8. A method according to claim 7, wherein said mixed solution is prepared by separately feeding an aqueous solution of said lithium compound, an aqueous solution of said transition metal compound and an aqueous solution of said organic acid to a spraying zone and mixing the separate solutions immediately before spraying to provide said mixed aqueous solution.

9. A method according to claim 7, wherein said transition metal consists of a manganese compound and a ratio by molar ion concentration between lithium and manganese in said solution is in the range of 0.5<Li/Mn≦0.62.

10. A method according to claim 9, wherein the ratio between lithium and manganese is in the range of 0.54≦Li/Mn≦0.62.

11. A method according to claim 7, wherein said transition metal compound consists of a mixture of a manganese compound and a compound of a transition metal, Me, other than Mn wherein a ratio by molar ion concentration between lithium and manganese in said solution is in the range of 0.5<Li/Mn≦0.62 and a ratio by molar ion concentration between Li+Me and Mn is in the range of 0.5<(Li+Me)/Mn≦0.67.

12. A method according to claim 11, wherein a ratio by molar ion concentration between Me and Mn is in the range of Me/Mn≦0.06.

13. A method according to claim 12, wherein said lithium compound consists of lithium hydroxide, said transition metal compound consists of manganese acetate, and said organic acid consists of citric acid.

14. A method according to claim 7, wherein said droplets are heated at a temperature of from 250° C. to 1100° C.

15. A method according to claim 7, wherein said droplets have a size of 100 μm or below.

16. A method according to claim 7, wherein said solution is adjusted in pH to a range of 4 to 7.

17. A method according to claim 16, wherein the pH is adjusted by means of a base.

18. A method according to claim 7, wherein said active substance is further thermally treated at a temperature of 400° to 1100° C.

19. A method according to claim 7, wherein said active substance is divided into fine pieces, subjected to compression molding in a desired shape, and fired at a temperature of 400° to 950° C.

20. A method according to claim 1, wherein said transition metal consists of Mn.

21. A method according to claim 1, wherein the transition metal is at least one member selected from the group consisting of manganese, cobalt, nickel, vanadium, iron, copper, titanium, and chromium.

22. A method according to claim 1, wherein the transition metal is at least one member selected from the group consisting of manganese and copper.

23. A method for preparing an active substance for use in a positive electrode in a chemical cell comprising a negative electrode and a positive electrode, said method comprising the steps of:

preparing a mixed aqueous solution of at least one water-soluble lithium compound, at least one water-soluble transition metal compound, oxygen, and at least one organic acid selected from the group consisting of organic acids having at least one carboxyl group and at least one hydroxyl group, organic acids having at least two carboxyl groups, and mixtures thereof;

preparing an organic acid complex consisting of lithium at least one transition metal in the solution, and oxygen; and spraying said solution comprising the complex and heating the resultant droplets at a temperature sufficient for thermal decomposition of the complex to obtain the active substance, wherein the thermal decomposition of the complex occurs simultaneously with the formation of the complex.

24. A method according to claim 23, wherein said lithium compound is a member selected from the group consisting of lithium hydroxide, lithium acetate, lithium carbonate, lithium nitrate and mixtures thereof.

25. A method according to claim 23, wherein said transition metal compound is at least one member selected from the group consisting of hydroxides, carbonates, acetates, sulfates, hydrochlorides, and nitrates or manganese, cobalt, nickel, vanadium, iron, copper, titanium and chromium.

26. A method according to claim 23, wherein said transition metal consists of a manganese compound and a ratio by molar ion concentration between lithium and manganese in said solution is in the range of $0.5 < Li/Mn \leq 0.62$.

27. A method according to claim 26, wherein the ratio between lithium and manganese is in the range of $0.54 \leq Li/Mn \leq 0.62$.

28. A method according to claim 23, wherein said transition metal compound consists of a mixture of a manganese compound and a compound of a transition metal, Me, other than Mn wherein a ratio by molar ion concentration between lithium and manganese in said solution is in the range of $0.5 < Li/Mn \leq 0.62$ and a ratio by molar ion concentration between Li+Me and Mn is in the range of $0.5 < (Li+Me)/Mn \leq 0.67$.

29. A method according to claim 28, wherein a ratio by molar ion concentration between Me and Mn is in the range of $Me/Mn \leq 0.06$.

30. A method according to claim 23, wherein said lithium compound consists of lithium hydroxide, said transition metal compound consists of manganese acetate, and said organic acid consists of citric acid.

31. A method according to claim 23, wherein said droplets are heated at a temperature of from 25° C. to 1100° C.

32. A method according to claim 23, wherein said droplets have a size of 100 μm or below.

33. A method according to claim 23, wherein said solution is adjusted in pH to a range of 4 to 7.

34. A method according to claim 33, wherein the pH is adjusted by means of a base.

35. A method according to claim 23, wherein said active substance is further thermally treated at a temperature of 400° to 1100° C.

36. A method according to claim 23, wherein said active substance is divided into fine pieces, subjected to compression molding in a desired shape, and fired at a temperature of 400° to 950° C.

37. A method according to claim 23, wherein the transition metal is at least one member selected from the group consisting of manganese, cobalt, nickel, vanadium, iron, copper, titanium, and chromium.

38. A method according to claim 23, wherein the transition metal is at least one member selected from the group consisting of manganese and copper.

39. A method for preparing an active substance for use in a positive electrode in a non-aqueous electrolytic secondary cell comprising a negative electrode and a positive electrode, said method comprising the steps of:

providing an amorphous citrate complex consisting of lithium and at least one transition metal; and firing the complex at a temperature sufficient to obtain the active substance.

40. A method according to claim 39, wherein said complex is fired at a temperature of 300° to 900° C.

41. A method according to claim 39, wherein said amorphous citrate complex is prepared by a procedure which comprises the steps of preparing a mixed aqueous solution of a water-soluble compound selected from the group consisting of lithium hydroxide and lithium carbonate, a water-soluble salt of a transition metal and a citric acid, and dehydrating said mixture to obtain an amorphous citrate complex.

42. A method according to claim 39, wherein said mixture is prepared by sufficient mixing at a temperature not higher than 40° C. and is immediately subjected to dehydration.

43. A method according to claim 39, wherein said mixture is dehydrated by heating at a temperature of from 100° C. to lower than 150° C. under reduced pressure to obtain a gel and drying the gel to obtain an amorphous citrate complex.

44. A method according to claim 39, wherein said transition metal consists of manganese and said active substance consists of spinel form $LiMn_2O_4$.

45. A method according to claim 39, wherein said active substance consists of spinel form, $Li_{1-x}Cu_xMn_2O_4$, wherein x is in the range of from 0.02 to 0.2.

46. A method according to claim 39, wherein the transition metal is at least one member selected from the group consisting of manganese, cobalt, nickel, vanadium, iron, copper, titanium, and chromium.

47. A method according to claim 39, wherein the transition metal is at least one member selected from the group consisting of manganese and copper.

48. A method for preparing an active substance for use in a positive electrode in a non-aqueous electrolytic secondary cell comprising a negative electrode, said method comprising the steps of:

preparing a mixed aqueous solution of a water soluble salt selected from the group consisting of lithium hydroxide, a transition metal acetate and citric acid;

dehydrating the mixed aqueous solution to obtain a citrate complex; and firing said citrate complex at a temperature ranging from 300° C. to 900° C. to obtain a composite oxide consisting of lithium, at least one transition metal, and oxygen.

49. A method according to claim 48, wherein the transition metal is at least one member selected from the group consisting of manganese, cobalt, nickel, vanadium, iron, copper, titanium, and chromium.

50. A method according to claim 48, wherein the transition metal is at least one member selected from the group consisting of manganese and copper.

* * * * *